United States Patent [19]
Gohlisch et al.

[11] Patent Number: 5,720,986
[45] Date of Patent: Feb. 24, 1998

[54] EXTRUSION HEAD FOR AN EXTRUSION INSTALLATION FOR THE RUBBER OR PLASTIC PROCESSING INDUSTRY

[75] Inventors: Hans-Joachim Gohlisch, Hanover; Wolfgang Rüger, Alfeld; Klaus Becker, Sibbesse, all of Germany

[73] Assignee: Paul Troester Maschinenfabrik, Hanover, Germany

[21] Appl. No.: 647,710

[22] Filed: May 14, 1996

[30] Foreign Application Priority Data

May 15, 1995 [DE] Germany .................. 195 17 246.9

[51] Int. Cl.[6] .................................. B29C 47/08
[52] U.S. Cl. .................. 425/131.1; 425/188; 425/192 R; 425/462
[58] Field of Search ................. 425/133.1, 188, 425/462, 380, 192 R, 131.1, 464

[56] References Cited

U.S. PATENT DOCUMENTS

| | | | |
|---|---|---|---|
| 3,902,835 | 9/1975 | Theysohn | 425/188 |
| 4,652,224 | 3/1987 | Golisch | 425/131.1 |
| 4,683,095 | 7/1987 | Tolonen et al. | 425/131.1 |
| 4,799,874 | 1/1989 | Bellmer et al. | 425/131.1 |
| 5,061,166 | 10/1991 | Gohlisch et al. | 425/188 |
| 5,242,290 | 9/1993 | Hiraiwa et al. | 425/188 |
| 5,332,380 | 7/1994 | Unland | 425/188 |

Primary Examiner—Jay H. Woo
Assistant Examiner—Iurie A. Schwartz
Attorney, Agent, or Firm—Emmanuel J. Lobato; Burns & Lobato, P.C.

[57] ABSTRACT

An extrusion head having a stationary part fixed on an extrusion installation having a plurality of extrusion cylinders supplying an extrudate formed from several components. The stationary part has extrudate flow channels each in communication with a respective extrusion cylinder and a common extrusion die. Two pivotable outer parts pivotally hinged on the stationary part are selectively swingable individually between open and closed positions by respective piston-cylinder units. The two outer parts define an extrusion orifice for the die in their closed position. A pair of locking piston-cylinders provided with hammerhead piston rods hold the respective outer parts clamped against the stationary during an extrusion. Actuator piston-cylinder units selectively swing the piston rods of the locking piston-cylinder units clear of the outer parts for opening them for cleaning extrudate channels or for an extrusion die change. Two pivotable inner parts between the outer parts and the stationary part define extrudate channels jointly with outer parts and stationary part and are selectively swingable by a respective piston-cylinder unit and exposing corresponding flow channels of the stationary part for cleaning when the outer parts are open. The inner parts have lateral flanges with a respective recess into which is inserted a retainer piston rod of a corresponding piston-cylinder unit to retain the respective inner part closing a respective stationary part flow channel against residual extrudate in the absence of extrusion of extrudate therethrough.

6 Claims, 8 Drawing Sheets

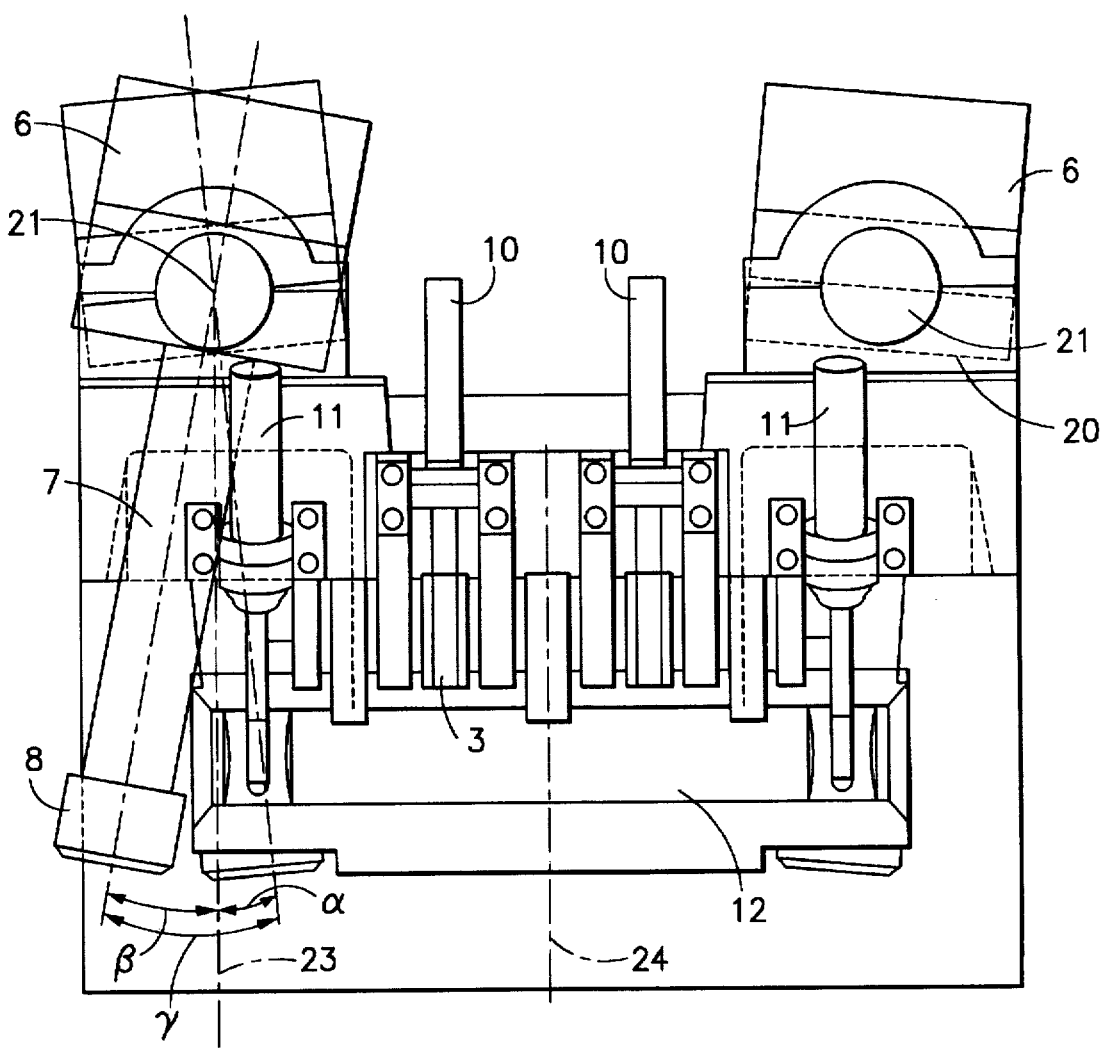
FIG.3
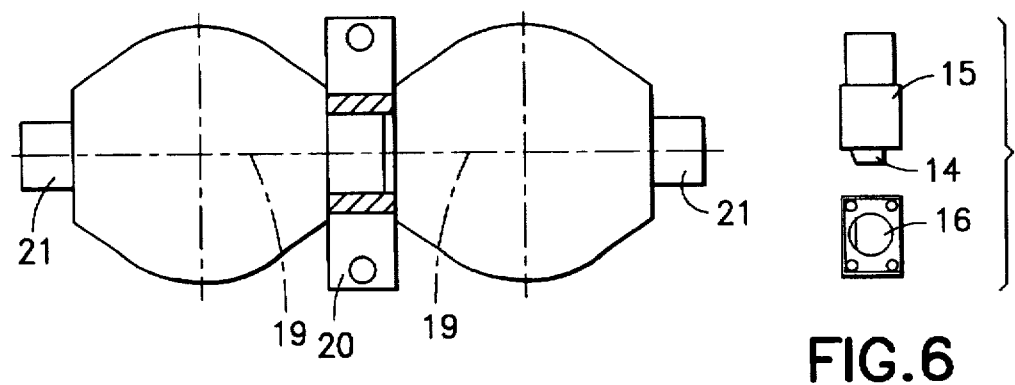
FIG.5
FIG.6

EXTRUSION HEAD FOR AN EXTRUSION INSTALLATION FOR THE RUBBER OR PLASTIC PROCESSING INDUSTRY

BACKGROUND OF THE INVENTION

1. Field of the Invention

The invention relates to an extrusion head for an extrusion installation or unit of the rubber or plastic processing industry. The extrusion head has a stationary fixed extrusion head part attached to the extrusion installation by means of a flange. It is provided with two pivotably outer movable extrusion head parts adjacent the extrusion die and are pivotable for cleaning purposes. The two pivotably movable outer parts are articulated to the fixed part of the extrusion head by means of an arrangement of hinge joints. The movable outer parts are firmly clamped to the fixed part, when closed, by respective locking piston-cylinder units arranged on either side such that the extrusion head movable outer parts are selectively swingable open. Two inner pivotably movable extrusion head parts capable of being swung between a corresponding outer movable part and the fixed part are provided.

2. Description of the Prior Art

Such an extrusion head is particularly advantageous for extrusion installations having several extrusion cylinders as often used in the tire industry for the production of tire treads, for example, or side walls, because with such an extrusion head it is possible to produce even very complicated treads out of two, three or four distinct rubber mixtures.

The extrusion installations have a corresponding number of extrusion cylinders which extrude into one extrusion head which has a corresponding number of movable parts and extrusion channels into a common extrusion die.

These extrusion installations work for a certain time with certain combinations of rubber mixtures that lend themselves well to production of one kind of tire. If a sufficient number have been produced for a production lot or run a change or modification of the production run is undertaken. In order to accomplish this, an extrusion die for producing a tread that has a different cross section is introduced, and in most cases a change of the rubber mixtures that are used is undertaken as well. Changing the rubber mixtures that are used makes cleaning of the extrusion channels in the extrusion head necessary.

Oftentimes only one single component of the rubber mixture is changed. Then only one single extrusion channel needs to be cleaned. The rest need not be cleaned if it is possible, while the cleaning of the single extrusion channel is in progress, to keep the remainder of the channels closed. Keeping the remainder of the channels closed is by no means customary. In most cases the extrusion heads are so constructed that when the extrusion head is opened all the extrusion channels are exposed and then all must be cleaned.

The German patent, DE 17 29 618, which has been known for more than two decades constitutes an exception. It discloses only a single movable extrusion head part, a stationary extrusion head part and an additional part of the extrusion head that is screwed onto the stationary part of the extrusion head. A lever is provided for deflecting the movable part or portion of the extrusion head, and a piston-cylinder unit connected thereto opens and closes the movable part of the extrusion head. An additional piston-cylinder unit serves as a tension bar to lock the movable part of the extrusion head during operation and it is able to accept the great forces that work on the movable extension head part as a result of the extrusion. In the case of this extrusion head the opening of the one movable part of the extrusion head results in only one extrusion channel being exposed. If the other extrusion channel is to be exposed the part of the extrusion head that is screwed onto the stationary part of the extrusion head must be removed. This is an awkward procedure.

An additional extrusion head became known as a result of the German Patent DE 34 27 022 C2, in which two movable extrusion head parts are attached to the stationary portion of the extrusion head using hinge joints. In this extrusion head the swinging and locking of both movable extrusion head parts are performed by one and the same piston-cylinder unit. Depending upon the need, one of the other extrusion channels can be exposed without having to open the other movable extrusion head part. This was a considerable progress development in extrusion technology.

A construction very similar to the two aforementioned embodiments was conceptualized as a result of the German patent DE 37 36 231, in which the tasks of swinging and locking both movable extrusion head parts is undertaken with two distinct piston-cylinder units.

Now there are still other construction types of extrusion installations in which more than two movable extrusion head parts are present. In this instance an additional movable inner extrusion head part is disposed between an outer movable extrusion head part and the stationary fixed part of the extrusion head. For these, due to a large number of extrusion channels, it is particularly interesting when changing a single component of a rubber mixture that the remaining extrusion channels need not be cleaned. All these different embodiments of extrusion heads, however, have in common the disadvantage that with these extrusion heads that have more than two movable parts the possibility of opening the extrusion head in such a way that only the desired extrusion channel is opened and exposed, while the other extrusion channels remain closed, does not exist.

SUMMARY OF THE INVENTION

The present invention avoids the disadvantages of the state of the art extrusion heads. It is an object of the present invention to provide a simple, space-saving construction with a simple cycle of movements, with extrusion heads having two, or more than two, movable parts with the possibility of opening the extrusion head in such a way that only the desired extrusion channel in each case lies exposed and opened while the other extrusion channels remain closed.

A feature of the invention resides in the fact that a separable connection is provided between the stationary part of the extrusion head and an inner part of the extrusion head that is pivotable.

In this way it is achieved that only a single extrusion channel, of several channels, is exposed when the extrusion head is opened and the remaining extrusion channels remain closed. This yields a considerable shortening of downtime periods while just one of the components of the mixture is being changed, if all of the other extrusion channels can remain closed.

A very simple but effective potential of the embodiment, according to the invention, resides in the fact that every inner, movable extrusion head part that is next to the stationary part of the extrusion is releasably clamped to the stationary part of the extrusion head by a retainer rod whose position may be shifted reciprocably.

In the process it is advantageous if the retainer rod whose position may be shifted, is the piston rod of a piston-cylinder unit or an attached part thereto, that is the equivalent of the piston rod. In this way the embodiment is very simple and also sturdy.

For easy insertion of the retainer rod into an acceptance hole it is advantageous if the retainer rod has a wedge-shaped or conical free end and if the acceptance recess in the other part of the extrusion head is complementary and also wedge-shaped.

The rod is configured and constructed in such a way that the rod and coupling piston-cylinder unit are designed dimensionally in such a way that they can accept the pressure of the residual extrudate mass between the parts of the head in such a way as to form a tight seal in the related flow channel in issue when the extrusion die is removed.

The coupling piston-cylinder unit that effects the fastening or coupling is mounted on a projection or a console that supports the piston-cylinder unit attached to the stationary part of the extrusion head.

The separable connection may, however, be embodied in other ways, for example, in such a way that the separable connection is a piston-cylinder unit that is attached by a hinge joint on the one hand to the part of the extrusion head that can pivot and on the other hand to the stationary part of the extrusion head.

BRIEF DESCRIPTION OF THE DRAWINGS

The essence of the invention is set forth below in greater detail by means of an embodiment that is illustrated schematically in the drawings in which:

FIG. 3 is a top plan view of the extrusion head in FIG. 1,

FIG. 5 is a view illustrating a bearing for a piston-cylinder unit in a locking position, FIG. 6 is an exploded view of a coupling piston cylinder unit for separably coupling a movable inner part of the extrusion head to the stationary part of the extrusion head, according to the invention.

DESCRIPTION OF THE PREFERRED EMBODIMENTS

Figure 1:
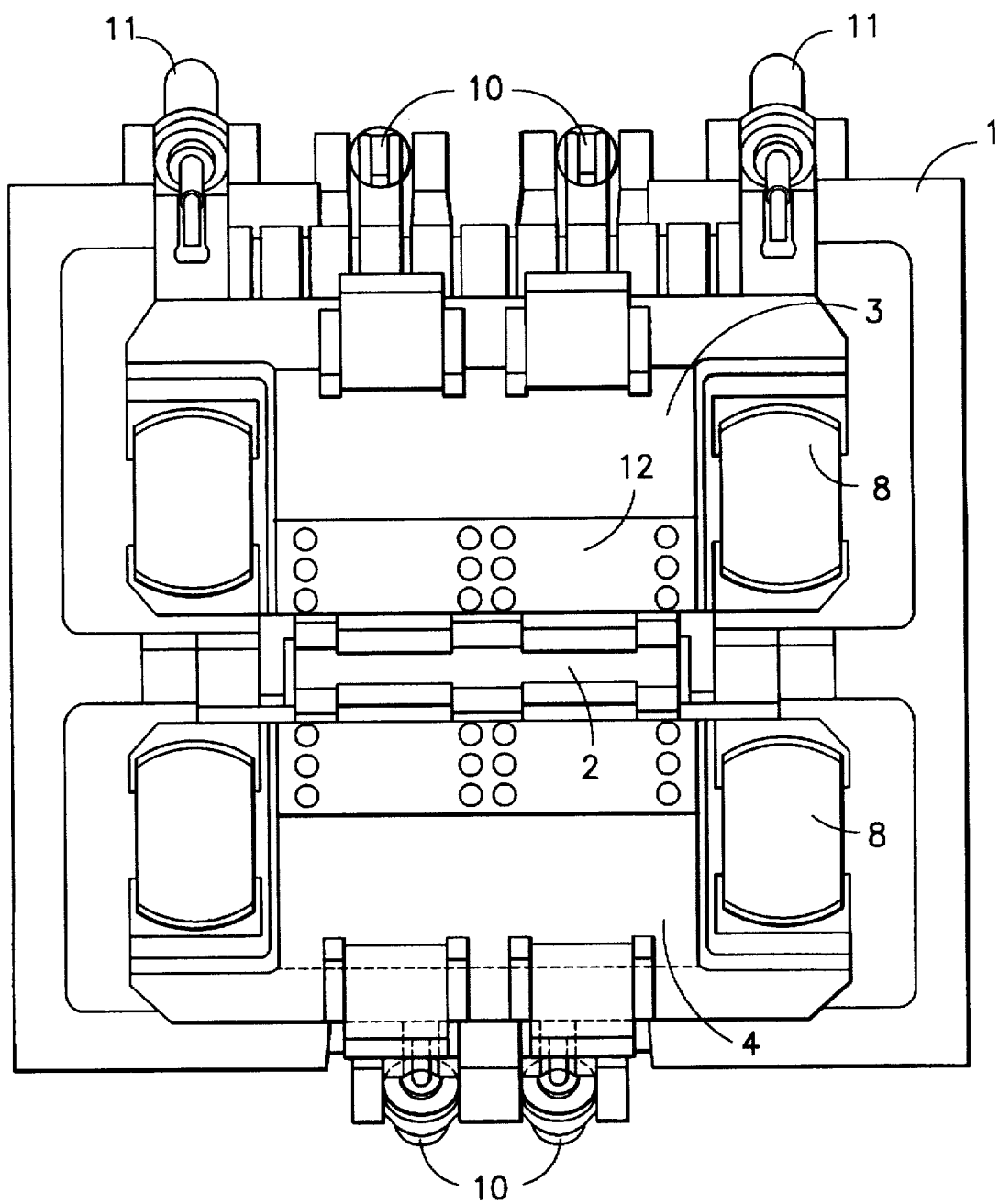
FIG. 1 is a front view of a extrusion head, according to the invention.
Figure 2:
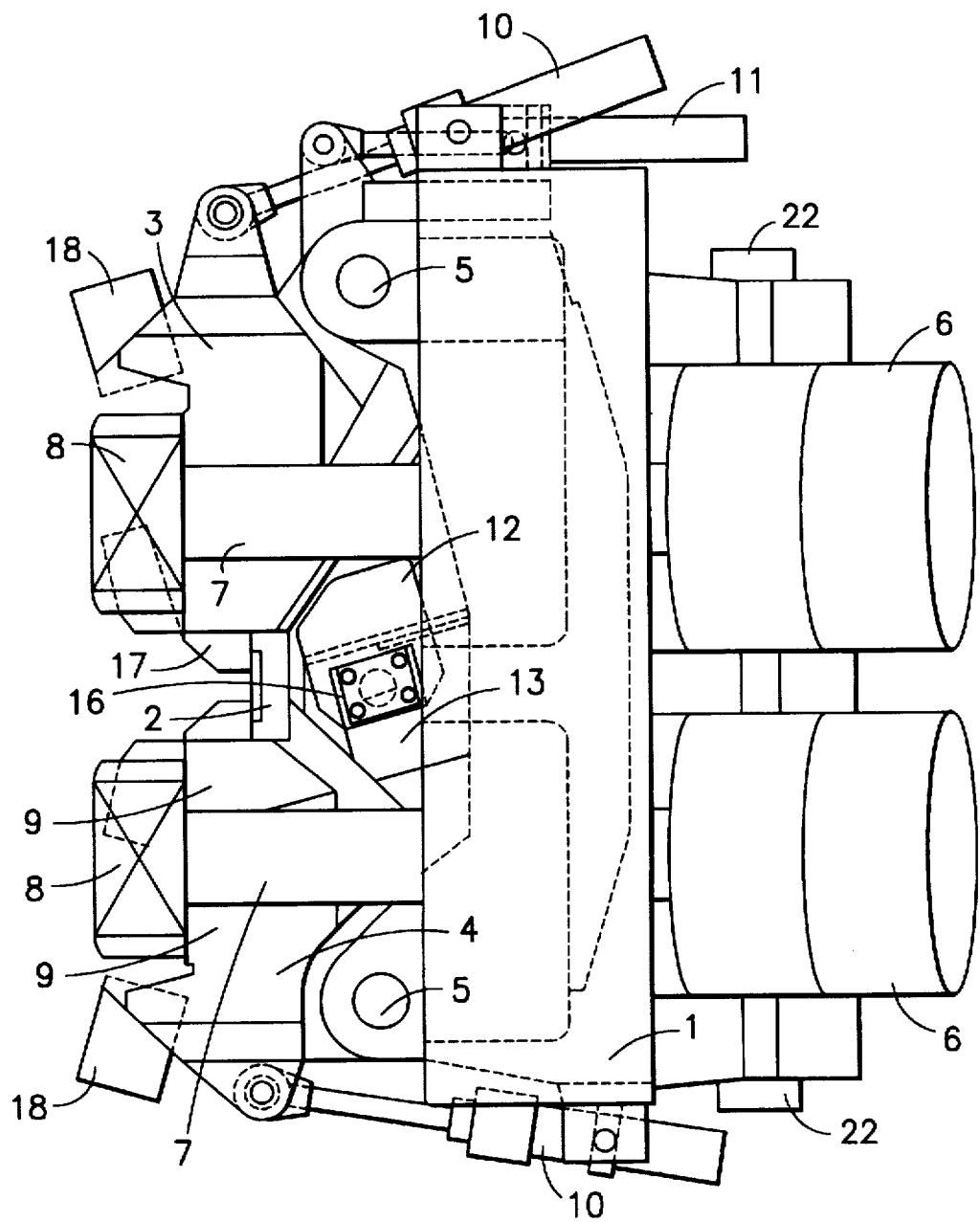
FIG. 2 is a side view of the extrusion head illustrated in FIG. 1.

The extrusion head, according to the invention, for an extrusion installation for the rubber or plastics processing industry has a stationary or fixed extrusion head part 1 that is attached to the extrusion installation by means of a flange. The extrusion head has two pivotable hinged outer parts 3, 4 which are attached by hinged joints 5 to the stationary part 1 and deflectable for cleaning purposes. The two movable parts 3, 4 can be swung to an open and a closed position defining an extrusion orifice for an extrusion die 2. When in a closed position piston-cylinder units 6 arranged on either side as locking devices maintain the individual movable head parts when closed firmly clamped to the stationary part 1. The piston-cylinder units 6 each have a piston rod 7 which is provided at its free end with a catch 8 that is shaped like the head of a hammer. The hammerhead shaped catch 8 engages behind protrusions or projections 9 on the movable extrusion head parts 3, 4 or directly at the extrusion head parts 3, 4 to maintain them clamped against the stationary part 1. The piston-cylinder units 6 function as locks and accordingly each have a cylinder that is short but each cylinder has a large diameter.

Figure 4:
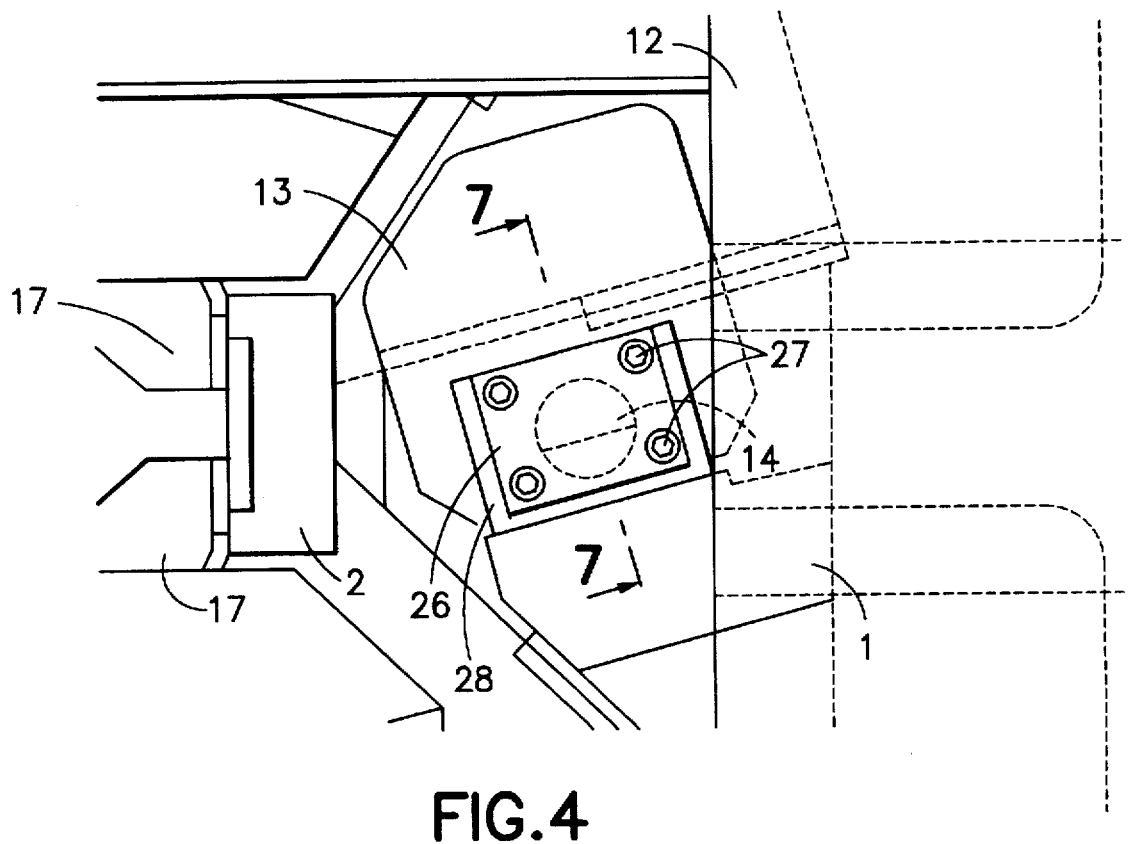
FIG. 4 is a section view taken through the center of the extrusion head.

Provision is made for additional piston-cylinder units 10 for swinging or pivoting the movable outer parts 3, 4 of the extrusion head and in each case; as shown in FIG. 3, an additional piston-cylinder unit 11 for swinging to an open and a closed position pivotable inner extrusion head parts 12 between the outer movable parts 3, 4 of the extrusion head and the stationary part 1 of the extrusion head. These extrusion head inner parts 12, as shown in FIG. 4, have on both sides lateral flanges 13 that extend toward the stationary part 1 of the extrusion head encompassing the inner part of the extrusion head part 1 and may be secured at the stationary part 1 of the extrusion head by means of a retainer rod 14 that is formed as the piston rod of an additional piston-cylinder unit 15. This rod engages in a corresponding complementary hole 16 in the movable parts 13 of the extrusion head ensuring as it does that in the arrested position of the inner movable extrusion head parts 12 with reference to the stationary part 1 of the extrusion head forms a tight seal against the pressure of the residual mass of extrudate.

The movable outer parts 3, 4 are disposed adjacent to the extrusion die 2 and define an extrusion opening orifice to the extrusion die 2 which is secured in the usual manner in the extrusion head by slides 17 which can be shifted by additional piston-cylinder units 18.

The piston-cylinder units 6 having piston rods that serve as tie bars or locks are mounted on a corresponding bearing so that they may be swung around an axis 19 and this is accomplished in point of fact by means of pillow blocks 20 of which only one in the center is illustrated in FIG. 5. The piston-cylinder units 6 are provided with bearing journals 21 on either side. At the sides of the piston-cylinder units 6 which are turned toward one another one bearing journal is hollow so that the other bearing journal can enter thereinto and engage it. The position of the pivotal bearing axis 19 of the piston cylinder units 6 is selected in such a manner that it passes through the anterior part of the cylinder.

The piston-cylinders 6 in each instance are provided with an actuator or additional piston cylinder unit or hydraulic motor 22 provided for swinging the piston cylinder units 6 to an unclamped state into a non-operational or unlocking position.

The piston-cylinders unit 6 that serve as the tie bars or locks may be swung at either side of the extrusion head around an acute angle γ at either side of an imaginary plane 23, as shown in FIG. 3 which runs parallel to the central axis 24 of the extrusion head. The piston-cylinder units 6 are swingable to that side in the operational state of the extrusion head that is turned toward the extrusion head (angle α) whereas in the open position of the movable part of the extrusion head they are disposed on the other side of the imaginary plane 23 (angle β). The movable parts 3, 4 of the extrusion head have the engagement surface for the catch 18 on the piston rods 7 inclined obliquely in keeping with the angle α.

As illustrated in FIG. 4 the hole 16 for accepting the rod 14 is illustrated as disclosed in a plate or housing of the piston-cylinder unit 26 which is secured to the lateral flange 13 by means of a plurality of screws 27. This the lateral flange 13 is provided laterally to the inner movable part 12 of the extrusion head at both of its sides.

Figure 7:
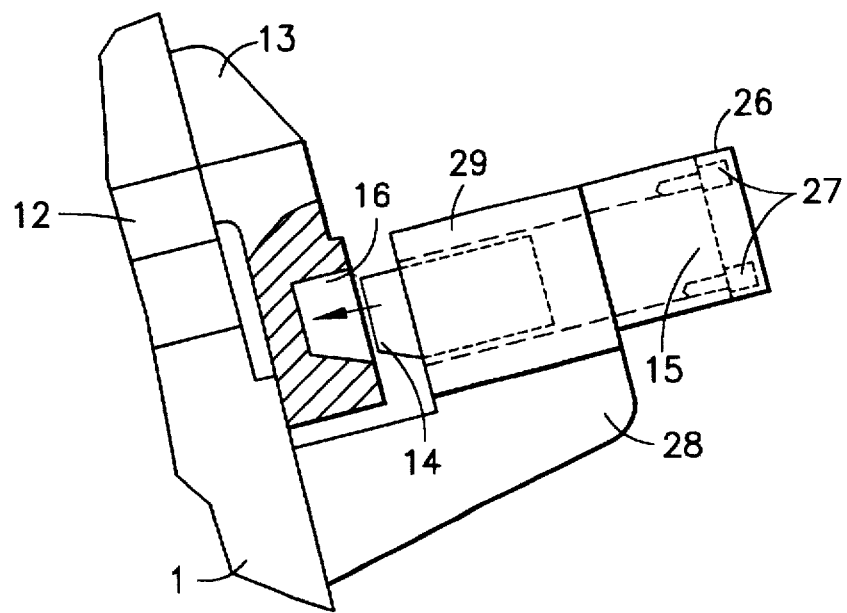
FIG. 7 is a view at section line C-D of FIG. 4 through the coupling piston-cylinder unit of the fastener.

The rod 14 that is inserted into the hole 16 is constructed as shown in FIG. 7 and is the piston rod of a piston cylinder unit 15 which is mounted on a bearing in a console 28 on the stationary part 1 of the extrusion head. This console has a tension apparatus 29 in which the cylinder of the piston-cylinder unit 15 is positioned.

Figure 8:
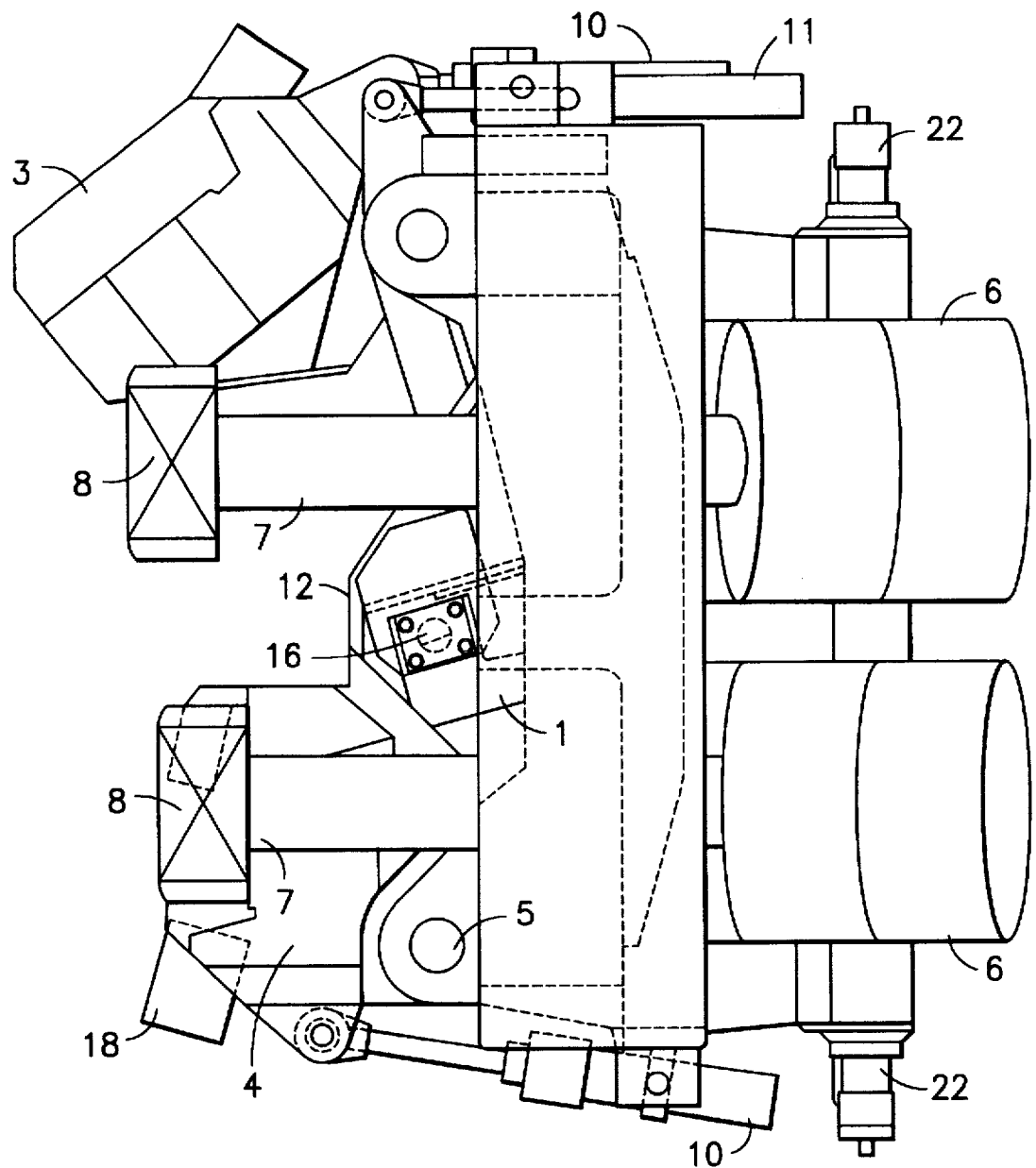
FIG. 8 is a side view of the extrusion head of FIG. 1 in a partially opened state, illustrating in an opened state the outer movable part of the upper half of the extrusion head.

FIG. 8 illustrates the upper half of the extrusion head opened. The outer movable part 3 of the extrusion head is swung upward with the aid of a piston-cylinder unit 10. The inner movable part 12 of the extrusion head is by contrast still firmly held against the stationary part 1 of the extrusion head by the rod 14.

Figure 9:
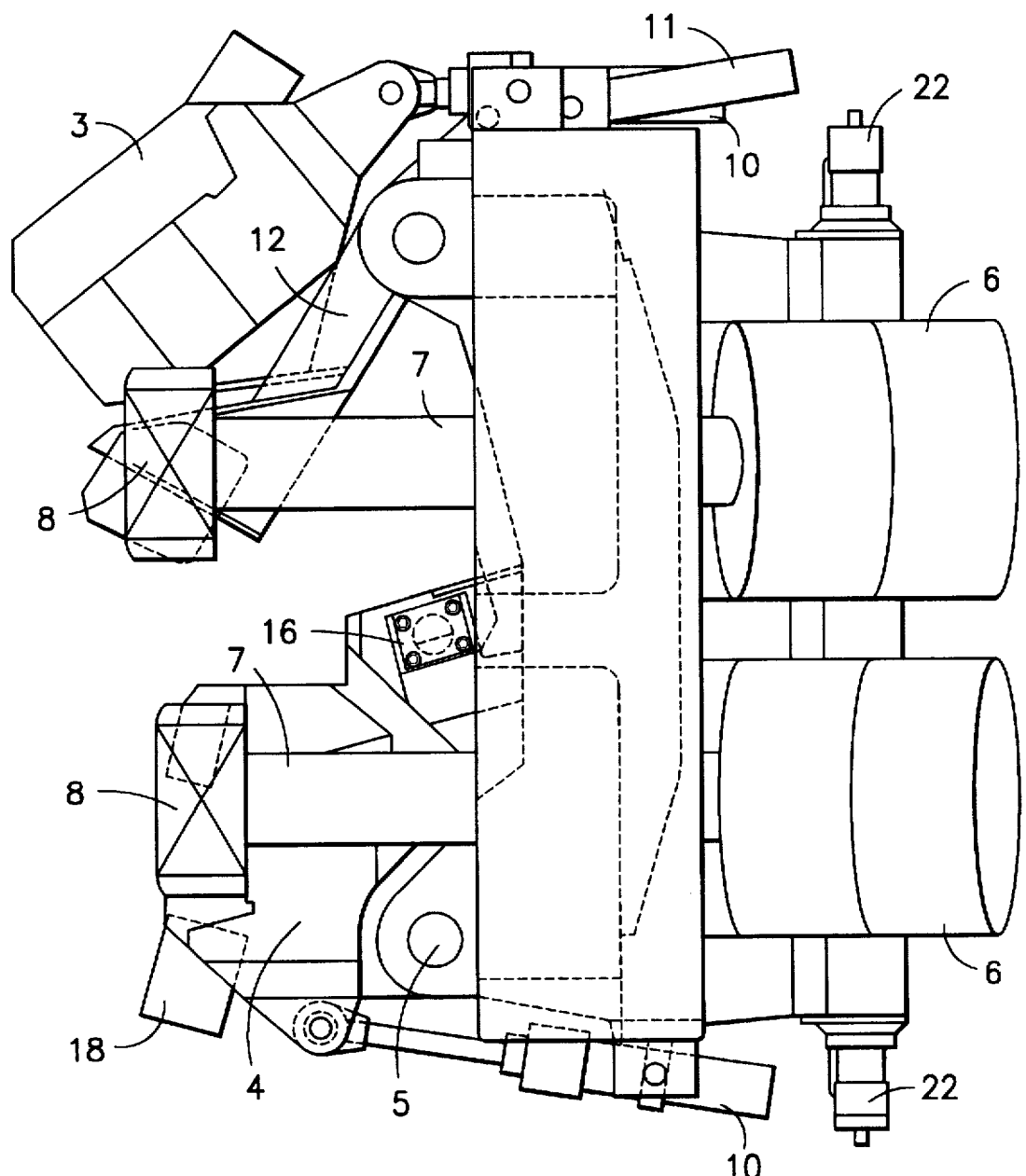
FIG. 9 is a side view of the extrusion head in a partially opened state with the open outer part and the opened inner part of the extrusion head in the upper half of the extrusion head.

In the embodiment illustrated in FIG. 9 the inner extrusion head part 12 which is illustrated in FIG. 8 is firmly clamped to the stationary fixed portion 1 of the extrusion head is also opened after removal or retraction of the fastener 14 from the hole 16 whereas the lower half of the extrusion head is still firmly closed.

Figure 10:
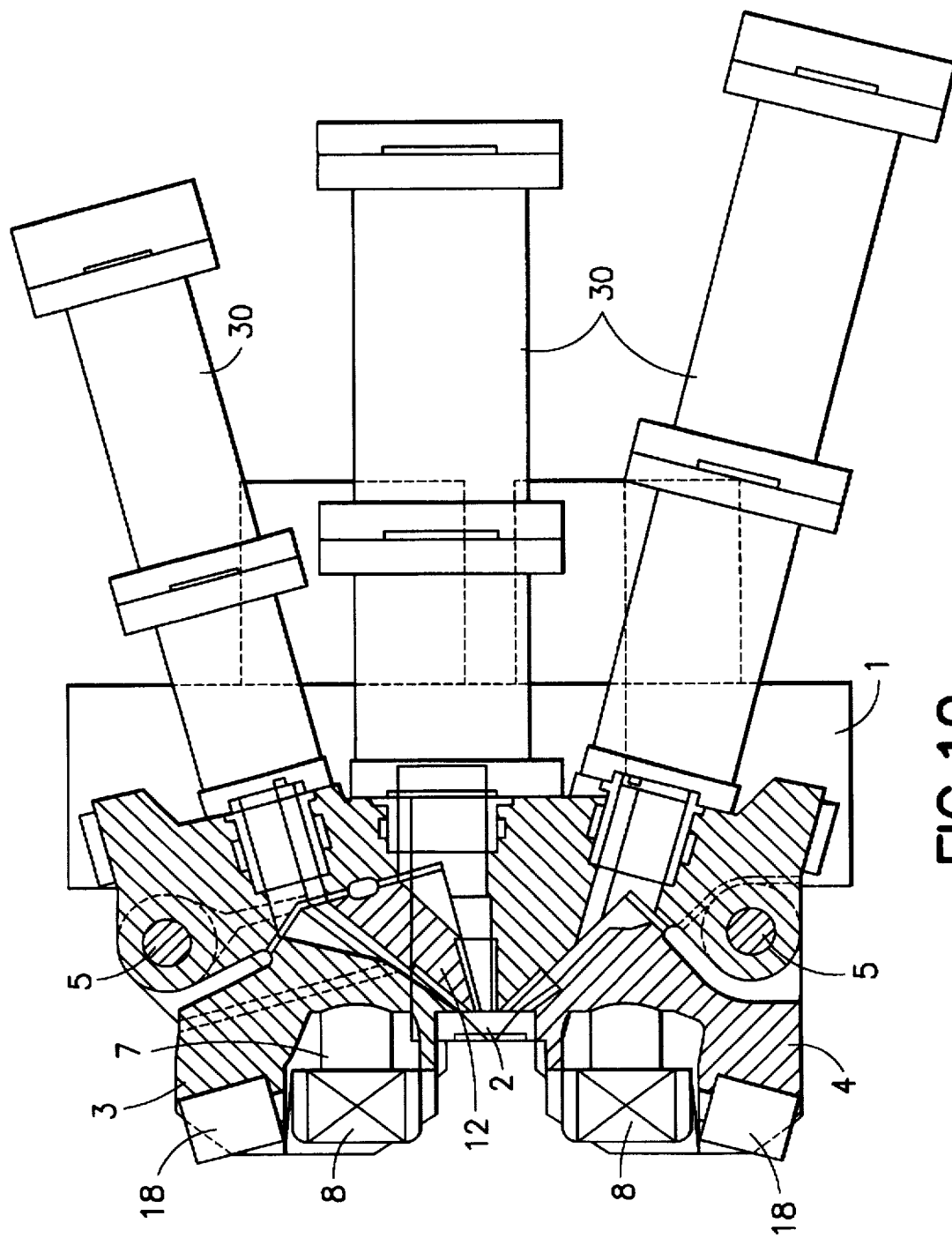
FIG. 10 is a view partly in section of an extruder installation having three extrusion cylinders.

FIG. 10 illustrates the flow paths or channels of an extrusion installation having three extrusion cylinders. The flow paths are shown in the sectioned part of the extrusion head.

Figure 11:
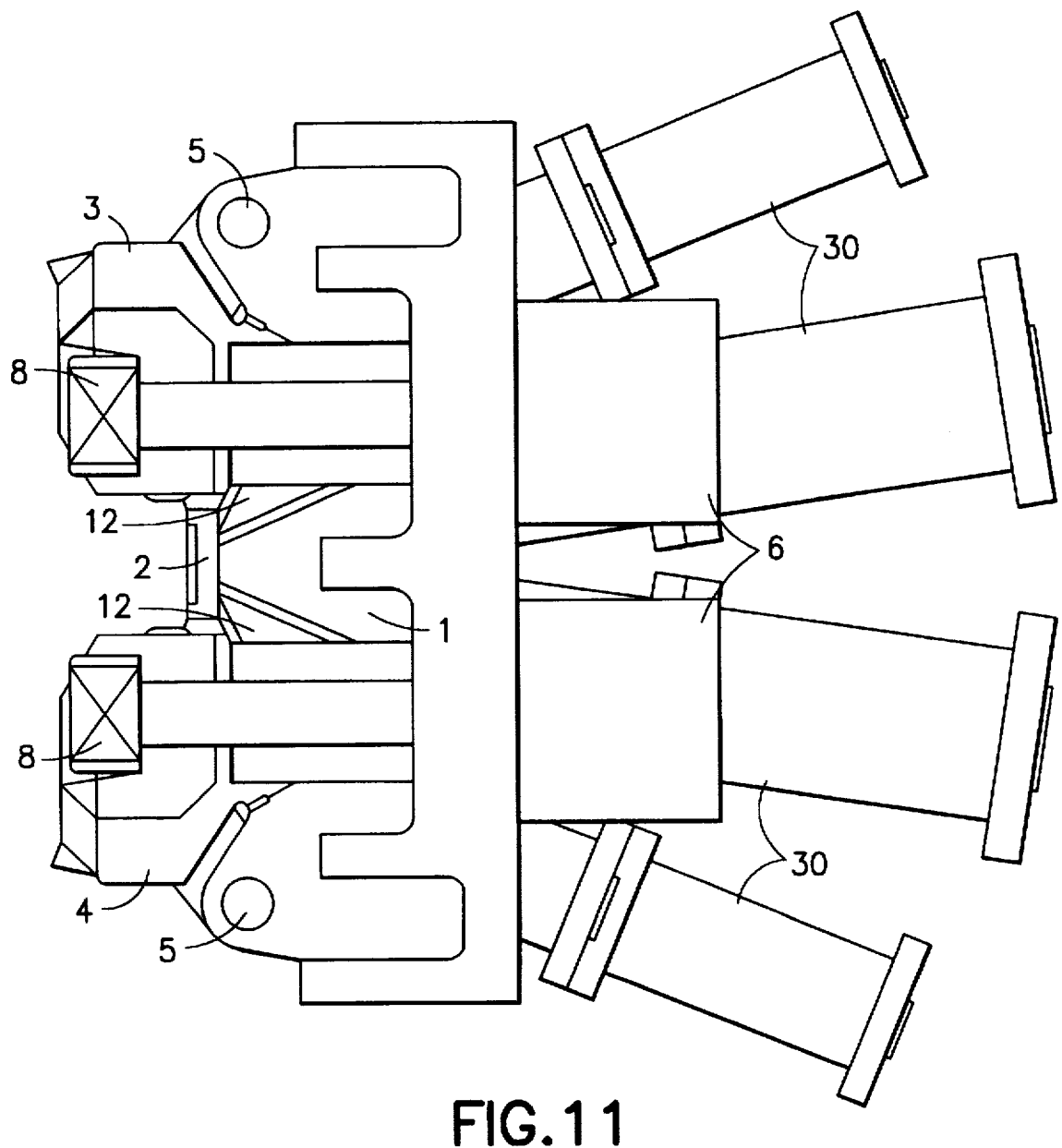
FIG. 11 is a side view of an extrusion head for an extrusion installation having four extrusion cylinders.

FIG. 11 is a view illustrating an extrusion installation with four extrusion cylinders 30 to which the extrusion head, according to the invention, has been applied.

Those skilled in the art will understand that the several piston-cylinder units are activated for moving the various movable extrusion head parts between operative positions, such as an open and closed position, by an electrical hydraulic control system, not shown, for actuating the different piston-cylinder units by controlling supply of hydraulic fluid under pressure to these units in the desired sequence, which can be programmed for operation, of the extrusion installation extrusion head movable parts.

What I claim is:

1. An extrusion head for an extrusion installation having a plurality of extrusion cylinders each having an extrudate discharge end portion, said extrusion head comprising:

a stationary part fixedly mounted on the discharge end portion of said extrusion cylinders and having individual stationary part extrudate flow channels therethrough each communicating individually with an individual corresponding extrudate discharge end portion of a respective individual extrusion cylinder;

a replaceable extrusion die on said extrusion head at an extrusion location for shaping extrudate from said extrusion cylinders;

two pivotally mounted outer parts hingedly mounted on said stationary part for movement between a closed position for jointly defining an extrusion orifice for extrudate discharged from said extrusion die and an open position for opening corresponding stationary part extrudate flow channels for cleaning the extrudate channels and for replacing of the extrusion die as desired, said two pivotally mounted outer parts each having an outer surface;

means for selectively pivotally moving said outer parts individually between said open position and said closed position, said means comprising for each outer part a respective piston-cylinder unit;

two pairs of swingable locking piston-cylinder units each having a piston rod free end catch releasably engaging an outer surface of a respective outer part for each releasably locking individually a respective pivotally mounted outer part in the closed position thereof during extrusion of extrudate;

additional piston-cylinder units for selectively swinging respectively the locking piston-cylinder units to position each piston-rod catch laterally and clear of the respective pivotally mounted outer parts to allow opening and closing thereof;

two pivotally mounted inner parts each disposed between a respective outer part in a closed position thereof and said stationary part for selectively closing a respective stationary part extrudate flow channel in communication with a corresponding extrusion cylinder discharge end portion and pivotable to open the respective stationary part extrudate flow channel in response to extrudate pressure during extrusion and defining jointly with a respective outer part in the closed position thereof respective extrudate flow channels providing communication between a respective stationary part extrudate flow channel and said extrusion die during an extrusion;

piston-cylinder units for selectively pivoting individually respective inner parts to an open position when a corresponding individual pivotable outer part is in an open position opening a corresponding stationary part extrudate flow channel for cleaning of the respective stationary part extrudate flow channel;

each pivotable inner part having a lateral surface having a recess;

for each pivotable inner part retaining means each having a retainer rod selectively inserted individually into a respective recess of a respective inner part for retaining a corresponding inner part closing a respective inner part extrudate flow channel in the absence of extrudate extrusion therethrough and against extrudate pressure due to residual extrudate in the respective inner part extrudate flow channel; and for each retainer rod a piston-cylinder for selectively individually axially reciprocating of each individual respective rod for insertion individually into a respective recess for retaining the respective inner part closing a respective inner part extrudate channel and retracting a respective individual retainer rod for allowing pivoting of a respective inner part for opening a corresponding inner part extrudate channel.

2. An extrusion head for an extrusion installation having a plurality of extrusion cylinders according to claim 1, in which each said retainer rod has a wedge shaped free end portion insertable into a respective recess of a respective inner part.

3. An extrusion head for an extrusion installation having a plurality of extrusion cylinders according to claim 2, in which each said retainer rod free end portion and each respective recess of each inner part have complementary configurations.

4. An extrusion head for an extrusion installation having a plurality of extrusion cylinders according to claim 3, in which each retainer rod comprises a free end portion of a reciprocable respective piston rod of a corresponding piston-cylinder unit.

5. An extrusion head for an extrusion installation having a plurality of extrusion cylinders according to claim 1, in which pivotable outer parts comprise an upper outer part pivotable upwardly and a lower outer part pivotable downwardly in respective open positions thereof.

6. An extrusion head for an extrusion installation having a plurality of extrusion cylinders according to claim 1, in which each retainer rod and each respective recess have complementary configurations.

* * * * *